United States Patent
Wang et al.

(10) Patent No.: US 10,666,934 B1
(45) Date of Patent: May 26, 2020

(54) CAMERA AUTOMATIC CALIBRATION METHOD AND OPTICAL MOTION CAPTURE SYSTEM

(71) Applicant: SHENZHEN REALIS MULTIMEDIA TECHNOLOGY CO., LTD, Shenzhen (CN)

(72) Inventors: Yue Wang, Shenzhen (CN); Xiaoqin Zhao, Shenzhen (CN); Qiuzi Xu, Shenzhen (CN)

(73) Assignee: SHENZHEN REALIS MULTIMEDIA TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/415,279

(22) Filed: May 17, 2019

(30) Foreign Application Priority Data

Dec. 27, 2018 (CN) .......................... 2018 1 1611431

(51) Int. Cl.
| | | |
|---|---|---|
| *H04N 17/00* | (2006.01) | |
| *G06T 7/80* | (2017.01) | |
| *H04N 5/247* | (2006.01) | |
| *G06T 7/00* | (2017.01) | |
| *G06T 7/50* | (2017.01) | |
| *G06T 7/70* | (2017.01) | |

(52) U.S. Cl.
CPC ............. *H04N 17/002* (2013.01); *G06T 7/50* (2017.01); *G06T 7/70* (2017.01); *G06T 7/80* (2017.01); *G06T 7/97* (2017.01); *H04N 5/247* (2013.01); *G06T 2207/30244* (2013.01)

(58) Field of Classification Search
CPC ...... H04N 17/002; H04N 17/00; H04N 17/02; H04N 5/247; G06T 7/80; G06T 7/50; G06T 7/97; G06T 7/70; G06T 2207/30244
USPC .................................................. 348/187, 180
See application file for complete search history.

(56) References Cited

U.S. PATENT DOCUMENTS

2015/0093042 A1* 4/2015 Zhu ........................... G06T 7/80
                                                    382/275
2019/0208181 A1* 7/2019 Rowell ..................... G06T 7/85

\* cited by examiner

*Primary Examiner* — Sherrie Hsia
(74) *Attorney, Agent, or Firm* — Anova Law Group, PLLC

(57) ABSTRACT

A camera automatic calibration method includes determining a camera to be recalibrated; and determining a point-to-point matching relationship between a first projection point set and a first collection point set. The first projection point set is formed in a camera coordinate system when first spatial coordinates, formed by capturing a plurality of test points using cameras other than the camera to be recalibrated, are projected onto the camera to be recalibrated, and the first collection point set is formed by capturing the test points using the camera to be recalibrated. The method includes calculating a distance difference between each point in the first projection point set and a matching point in the first collection point set according to the point-to-point matching relationship; obtaining a new calibration parameter of the camera to be recalibrated; and updating the current calibration parameter of the camera to be recalibrated with the new calibration parameter.

19 Claims, 4 Drawing Sheets

CAMERA AUTOMATIC CALIBRATION METHOD AND OPTICAL MOTION CAPTURE SYSTEM

CROSS-REFERENCES TO RELATED APPLICATIONS

This application claims the priority of Chinese Patent Application No. CN201811611431.6, filed on Dec. 27, 2018, the entire content of which is incorporated herein by reference.

FIELD OF THE DISCLOSURE

The present disclosure generally relates to the field of camera calibration technology and, more particularly, relates to a camera automatic calibration method and an optical motion capture system.

BACKGROUND

In the image measurement process and machine vision applications, in order to determine the relationship between the three-dimensional geometric position of a point on the surface of a space object and its corresponding point in the image, a geometric model of camera imaging must be established. The parameters of the geometric model are the parameters of the camera. In most cases, these parameters need to be obtained through experiments and calculations. The process of solving the parameters is called camera calibration (or camcorder calibration).

For example, in an optical motion capture system, an optical image of a moving object is acquired using a multi-camera method. During the optical motion capture process, the tracking and positioning software adopts a computer multi-vision principle, and calculates the coordinates and direction of the point cloud in the three-dimensional capture space according to the matching relationship between the two-dimensional point clouds of the images as well as the relative position and orientation of the cameras. Based on the three-dimensional coordinates of the point clouds, the position and orientation of each rigid body in the motion space are solved by identifying the rigid-body structures bound to different locations of the moving object, and then the motion trajectory of the moving object in the motion space is determined. In order to accurately calculate the coordinates of point clouds and the motion postures of the rigid bodies in the three-dimensional capture space, the motion capture system needs to determine the state of all cameras and the positional relationship between the cameras before operating, and thus camera calibration is required.

Regardless of whether it is in optical motion capture, image measurement, or machine vision applications, the calibration of camera parameters is a very critical part. The accuracy of the calibration results and the stability of the algorithm directly affect the accuracy of the results produced through the operation of the camera. Moreover, the calibration accuracy of the camera may directly affect the capturing accuracy of the entire optical motion capturing system, and thus may have a limited error tolerance. For example, a small calibration error may result in a substantial deviation. Therefore, performing a desired camera-calibration process is a prerequisite for subsequent operation.

However, in the process of operating an optical motion capture system, the calibration of cameras may still have the following problems. First, the operating environment of the system constantly changes, for example, there may be a difference in temperature between morning and evening, and the change in the operating environment may affect the operating status of the cameras. That is, the internal parameters of the cameras may be affected. Second, the installation environment of the camera will inevitably experience vibration, which may lead to shifts of the cameras with respect to their initial installation position, thereby affecting the current position relation between the cameras. That is, the external parameters of the cameras may be affected. Third, in actual applications, it is impossible to recalibrate the system at any time because recalibration of the cameras at any time may waste a lot of time and also significantly reduce the operating fluency of the entire system.

The disclosed camera automatic calibration method and optical motion capture system are directed to solve one or more problems set forth above and other problems in the art.

BRIEF SUMMARY OF THE DISCLOSURE

One aspect of the present disclosure provides a camera automatic calibration method used to calibrate a plurality of cameras. The method includes performing a determining step to determine a camera to be recalibrated from the plurality of cameras; and performing a processing step to, according to a first projection point set of a plurality of test points in space and a first collection point set of the plurality of test points captured by the camera to be recalibrated, determine a point-to-point matching relationship between the first projection point set and the first collection point set. The first projection point set is a set of two-dimensional points formed in a camera coordinate system when first spatial coordinates, formed by capturing the plurality of test points using cameras other than the camera to be recalibrated, are projected onto the camera to be recalibrated, and the first collection point set is a set of two-dimensional points formed by capturing the plurality of test points using the camera to be recalibrated. The method further includes performing a calculation step to, according to the point-to-point matching relationship, calculate a distance difference between each projection point in the first projection point set and a matching collection point in the first collection point set, and obtain a new calibration parameter of the camera to be recalibrated based on the distance difference; and performing an updating step to update a current calibration parameter of the camera to be recalibrated with the new calibration parameter.

Another aspect of the present disclosure provides an optical motion capture system. The optical motion capture system includes a plurality of cameras for capturing a plurality of test points, and a processor. The plurality of test points is disposed on one or more capture objects in a motion space. The plurality of cameras is distributed in the motion space, and each camera of the plurality of cameras is communicatively coupled to the processor to capture the plurality of test points on the one or more capture objects. The processor is configured to periodically calibrate each camera of the plurality of cameras according to a camera automatic calibration method. The camera automatic calibration method includes performing a determining step to determine a camera to be recalibrated from the plurality of cameras; and performing a processing step to, according to a first projection point set of a plurality of test points in space and a first collection point set of the plurality of test points captured by the camera to be recalibrated, determine a point-to-point matching relationship between the first projection point set and the first collection point set. The first projection point set is a set of two-dimensional points formed in a camera coordinate system when first spatial coordinates, formed by capturing the plurality of test points using cameras other than the camera to be recalibrated, are projected onto the camera to be recalibrated, and the first collection point set is a set of two-dimensional points formed by capturing the plurality of test points using the camera to be recalibrated. The camera automatic calibration method further includes performing a calculation step to, according to the point-to-point matching relationship, calculate a distance difference between each projection point in the first projection point set and a matching collection point in the first collection point set, and obtain a new calibration parameter of the camera to be recalibrated based on the distance difference; and performing an updating step to update a current calibration parameter of the camera to be recalibrated with the new calibration parameter.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
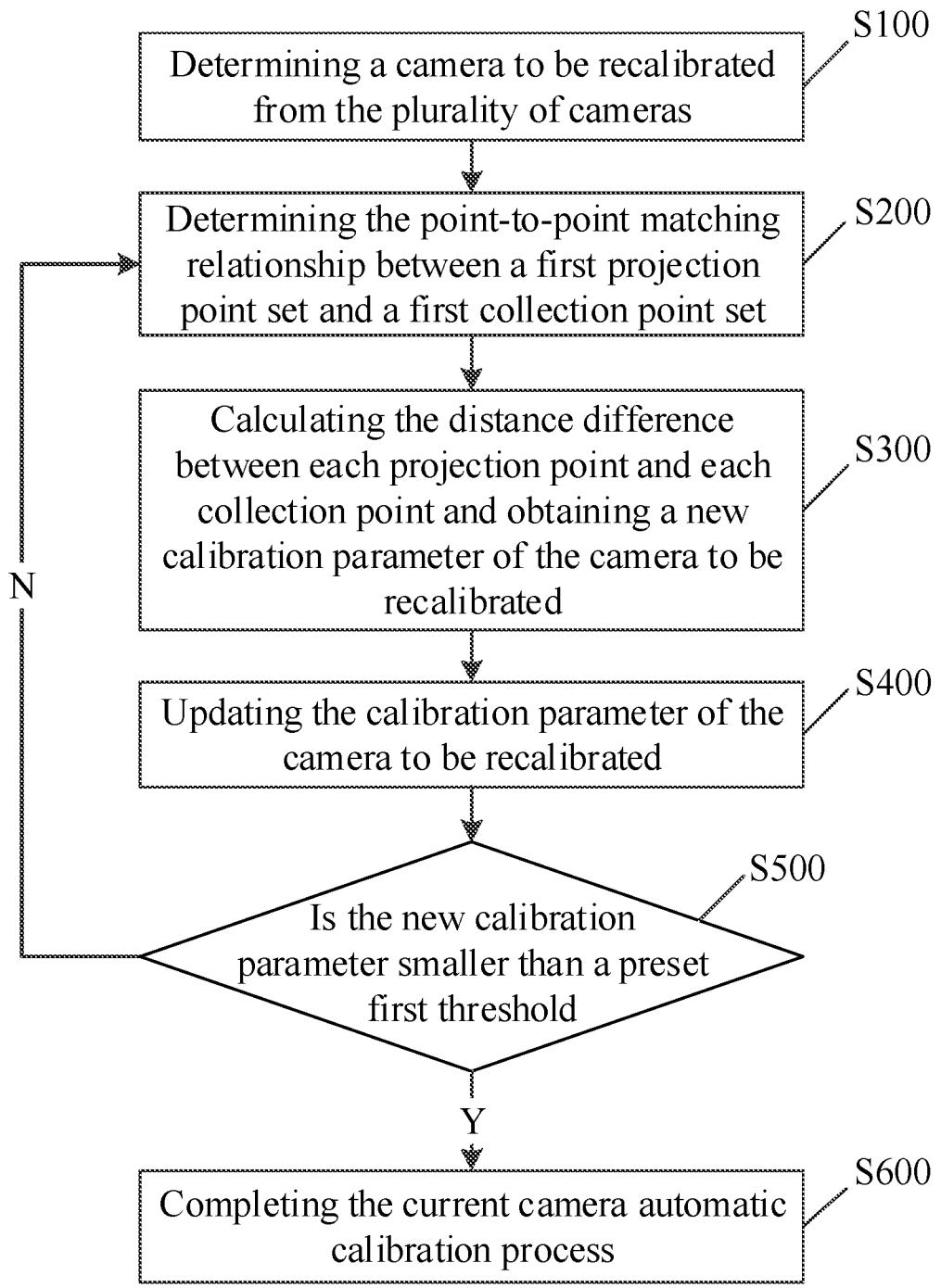
FIG. 1 illustrates a flowchart of a camera automatic calibration method consistent with various embodiments of the present disclosure.
Figure 2:
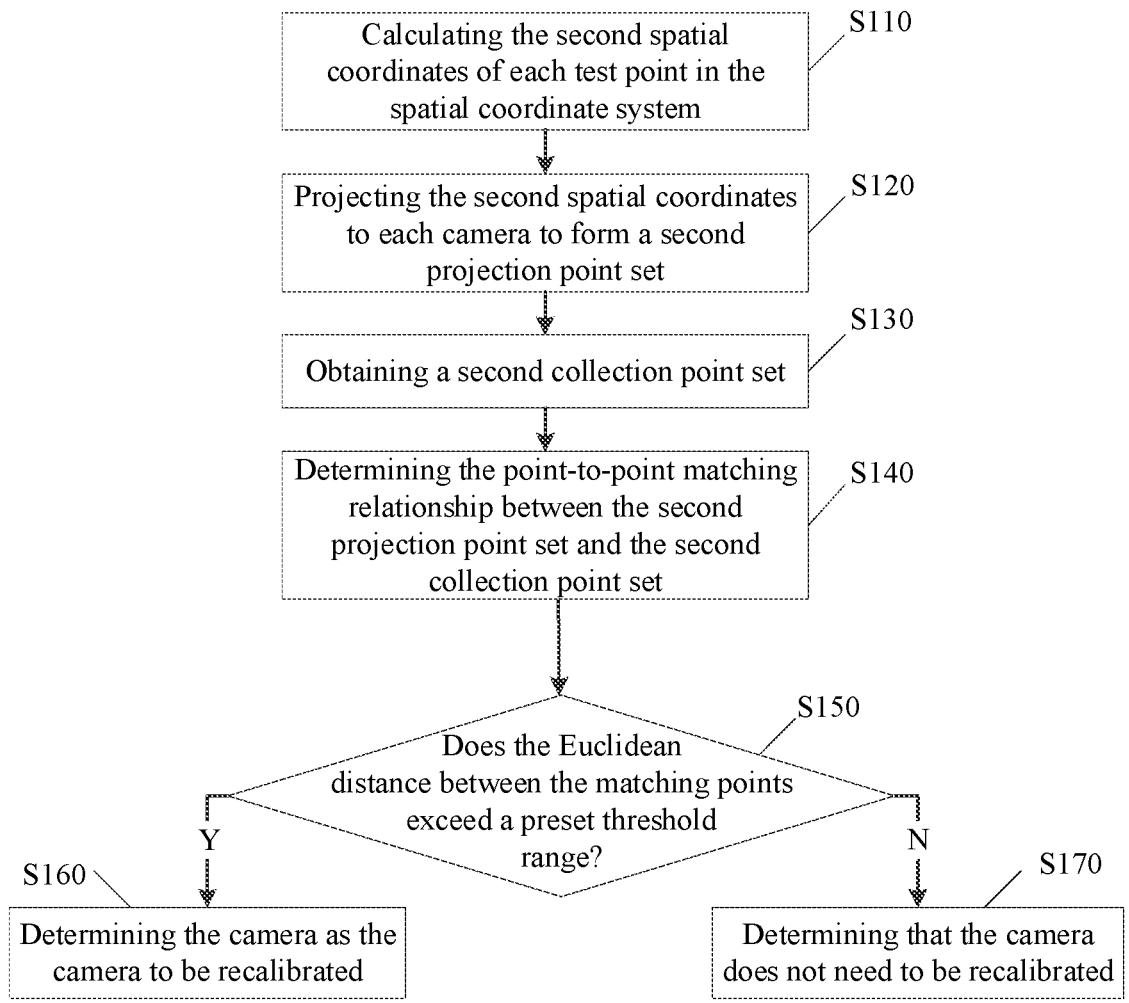
FIG. 2 illustrates a flowchart of a determining step in a camera automatic calibration method consistent with various embodiments of the present disclosure.

Reference will now be made in detail to exemplary embodiments of the invention, which are illustrated in the accompanying drawings. Wherever possible, the same reference numbers will be used throughout the drawings to refer to the same or like parts.

The present disclosure will be further described in detail below with reference to the accompanying drawings Similar elements in different embodiments adopt the numbers for related similar elements. In the following embodiments, many of the details are described in order to provide a better understanding of the application. However, those skilled in the art can easily understand that some of the features may be omitted in different situations, or may be replaced by other elements, materials, and methods. In some cases, some operations related to the present application are not shown or described in the specification to avoid the core part of the present application being overwhelmed by excessive description. For those skilled in the art, detailed description of these related operations is not necessary, and they can fully understand the relevant operations according to the description in the specification and the general technical knowledge in the field.

In addition, the features, operations, or characteristics described in the specification may be combined in any suitable manner to form various embodiments. In the meantime, the steps or actions in the method description can also be subjected to a sequence change or adjustment in a manner that can be apparent to those skilled in the art. Therefore, the various sequences in the specification and the drawings are merely for the purpose of describing a particular embodiment, and are not meant to be necessary sequences unless otherwise stated that one of the sequences must be followed.

The serial numbers themselves for the components herein, such as "first", "second", etc., are only used to distinguish the described objects, and do not have any order or technical meaning. As used herein, "connected" or "coupled", unless otherwise specified, includes both direct and indirect connections (coupling).

The present disclosure is aimed to solve the problem that in a computer vision system, especially in an optical motion capture system, camera calibration is not able to be performed in time when the internal parameters or the external parameters of cameras are changed. The present disclosure proposes a concept and a method of "automatic calibration". According to the present disclosure, without affecting the normal operation of the optical motion capture system, whether the current calibration information of the cameras is correct is determined by collecting the matching data between the three-dimensional space coordinates and the camera two-dimensional coordinates. When there is a significant deviation, the current camera-calibration file of the system will be automatically corrected. The purpose of correcting the current camera-calibration file is to determine the relationship between the three-dimensional geometric position of a point on the surface of a space object and the corresponding point in the image in real time, and establish a geometric model for camera imaging (the parameters of the geometric model are the internal and external parameters of the cameras), such that the positioning accuracy and the user experience may be ensured. Performing camera automatic calibration may be conducive to improving the accuracy and fluency of the system operation, and at the same time, to some extent, the problem of requiring camera calibration to be performed from time to time may be avoided, and thus the user time may be saved. It should be noted that the automatic calibration is proposed to determine deviations of the original calibration data of the cameras when the system is operating, and then perform automatic adjustment and optimization. However, when the positions of a large number of cameras are shifted, re-scanning the calibration may be required to solve the problem.

Embodiment 1

FIG. 1 illustrates a flowchart of a camera automatic calibration method consistent with various embodiments of the present disclosure. Referring to FIG. 1, the camera automatic calibration method is used to calibrate a plurality of cameras in a computer version system. The camera automatic calibration method may include steps S100-S400, which will be respectively described in detail in the following.

In step S100, a determining step may be performed to determine a camera to be re-calibrated from the plurality of cameras. In one embodiment, step S100 may include steps S110-S170, which will be respectively described in detail in the following.

In step S110, the second spatial coordinates of each test point in the spatial coordinate system may be calculated based on the images captured by the plurality of cameras.

It should be noted that, for example, in the optical motion capture system, the plurality of cameras may continuously capture images of a plurality of test points (such as multiple points on one or more capture objects, e.g., one or more rigid bodies) and create a spatial coordinate system (or global coordinate system) for the motion space in which the capture object is located; and then, the spatial coordinates of the capture object in the spatial coordinate system may be obtained by processing multiple images captured at the same time. Because the method of obtaining spatial coordinates by processing multiple images is a common technical method in optical motion capture, detailed description will not be provided here in the specification. Furthermore, because the spatial coordinate system represent a three-dimensional space, the second spatial coordinates of each test point may be three-dimensional coordinates, and the second spatial coordinates of the plurality of test points may be a set of three-dimensional coordinates.

In step S120, the second spatial coordinates of each test point may be projected to each camera according to the current calibration parameter of the camera to obtain a set of second projection points formed by the plurality of test points in the camera coordinate system of each camera.

Figure 4:
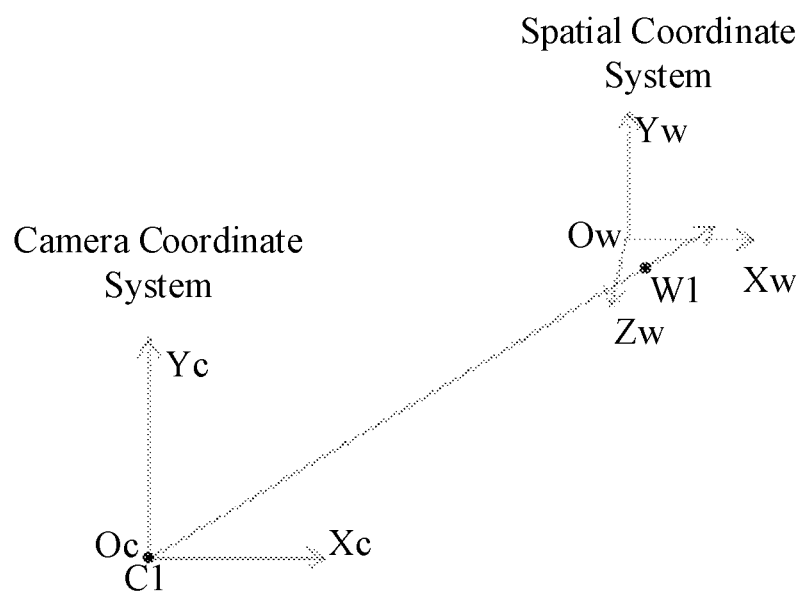
FIG. 4 illustrates a schematic diagram of forming a projection point through projection consistent with various embodiments of the present disclosure.

FIG. 4 illustrates a schematic diagram of forming a projection point through projection. In one embodiment, referring to FIG. 4, a spatial coordinate system Xw-Yw-Zw and a camera coordinate system Xc-Yc of a camera may be constructed, and the second spatial coordinates W1 of a test point in the spatial coordinate system may be obtained. By projecting the second spatial coordinates W1 to the camera coordinate system of the camera, a projection point C1 may be formed. Because of the differences in the rotation angle and position offset between the two coordinate systems, the current calibration parameter of the camera may be used in the projection process such that the projection point C1 can be obtained from the second spatial coordinates W1 using the current calibration parameter. At the same time, other second spatial coordinates may be projected to other camera coordinate systems, and thus a set of multiple projection points may be obtained. In one embodiment, the set of the obtained projection points may be defined as a second projection point set. Further, because the second spatial coordinates of each test point are projected to the Yc-Yc plane of the camera coordinate system, each projection point formed through projection may be a data with two-dimensional coordinates. That is, an orthogonal projection from three-dimensional coordinates to two-dimensional coordinates may be implemented.

It should be noted that the spatial coordinate system has a mapping relation to the real object in space, and the origin of the spatial coordinate system is usually Ow. The camera coordinate system is a coordinate system using the optical axis of the camera as the Z axis. The center of the light in the camera optical system is the origin Oc (actually, the center of the lens). The horizontal axis Xc and the vertical axis Yc may not be parallel to the corresponding axes of the spatial coordinate system; instead, the horizontal axis Xc and the vertical axis Yc may each have a certain angle with respect to the corresponding axis of the spatial coordinate system and may have a certain offset or translation in space.

In step S130, a second collection point set may be obtained. The second collection point set may refer to a set of two-dimensional points formed by processing the images of the plurality of test points by each camera of the plurality of cameras. That is, the second collection point set may be a set of two-dimensional points formed by directly mapping each test point onto the camera coordinate system of each camera.

Figure 5:
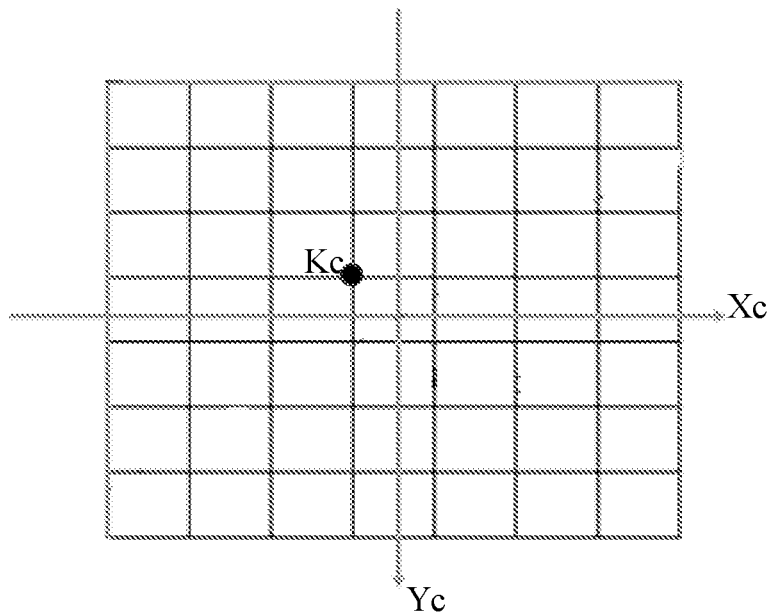
FIG. 5 illustrates a schematic diagram of forming a collection point through image processing consistent with various embodiments of the present disclosure.

FIG. 5 illustrates a schematic diagram of forming a collection point through image processing. In one embodiment, referring to FIG. 5, a camera coordinate system may be constructed. When the camera is used to capture images of a test point, the test point may be directly mapped onto the lens of the camera by light, and thus form a collection point in the camera coordinate system of the camera. The collection point may be presented as a two-dimensional point, e.g. Kc, on the captured image. In addition, because the test point is directly mapped onto the Xc-Yc plane of the camera coordinate system, the collection point Kc formed through mapping may be a data with two-dimensional coordinates.

In step S140, for each camera, the Euclidean distance between each projection point in the second projection point set and each collection point in the second collection point set may be respectively calculated to determine the point-to-point matching relationship between the second projection point set and the second collection point set. In one embodiment, for a projection point in the second projection point set, when a collection point in the second collection point set has the minimum Euclidean distance from the projection point, the collection point and the projection point may be considered as having a matching relationship. That is, for a projection point in the second projection point set, the collection point that has the minimum Euclidean distance from the collection point may be considered as a matching collection point of the projection point.

It should be noted that, because the second projection point set formed on the camera coordinate system includes the projection coordinates of each test point and the second collection point set formed on the camera coordinate system through mapping also includes the mapping coordinates of each test point, for a randomly-selected test point, it may still not be able to establish the correspondence between the projected coordinates of the test point and the mapped coordinates of the test point. Therefore, in one embodiment, the minimum Euclidean distance is used as the criterion. For example, when the Euclidean distance between a projection point and a collection point is the smallest, the projection point and the collection point may be considered as corresponding to the same test point, that is, the two points may have a matching relationship. Therefore, according to step S140, a point-to-point matching relationship can be obtained between the second projection point set formed in the camera coordinate systems of the plurality of cameras and the second collection point set formed through image processing.

In step S150, for each camera, whether the Euclidean distance between the points with a matching relationship exceeds a preset threshold range may be determined. That is, whether the Euclidean distance between each projection point in the second projection point set and the matching collection point in the second collection point set exceeds a preset threshold range Y1 may be determined. When the Euclidean distance between the points with a matching relationship exceeds the preset threshold range Y1, step S160 may be performed; otherwise, step S170 may be performed.

In step S160, when the Euclidean distance between the points with a matching relationship exceeds the preset threshold range Y1, the current calibration parameter of the camera may be regarded as likely causing substantial measurement errors, and thus the camera may be determined as a camera to be re-calibrated.

It should be noted that, in an ideal situation without measurement errors, the Euclidean distance between the points with a matching relationship should be zero.

In step S170, when the Euclidean distance between the points with a matching relationship does not exceed the preset threshold range Y1, the measurement errors caused by the current calibration parameter of the camera may be considered as still within a controllable range, and thus it may not be necessary to re-calibrate the calibration parameter of the camera.

Figure 3:
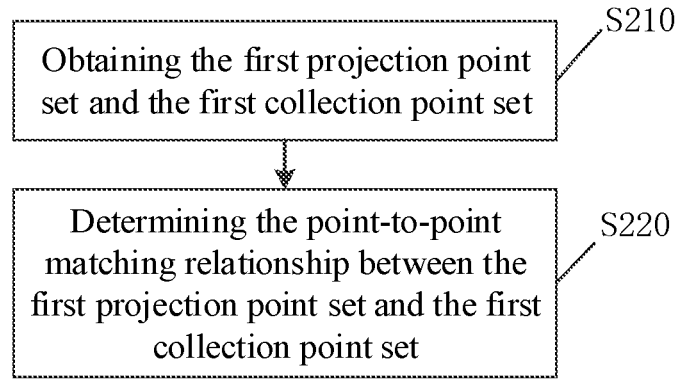
FIG. 3 illustrates a flowchart of a processing step in a camera automatic calibration method consistent with various embodiments of the present disclosure.

In step S200, a processing step may be performed to, according to a first projection point set of the plurality of test points and a first collection point set of the plurality of test points captured by the camera to be re-calibrated, determine the point-to-point matching relationship between the first projection point set and the first collection point set. In one embodiment, the first projection point set may refer to a set of two-dimensional points formed in the camera coordinate system when the first spatial coordinates are projected onto the camera to be re-calibrated. The first spatial coordinates may be formed by capturing the plurality of test points using cameras other than the camera to be re-calibrated. FIG. 3 illustrates a flowchart of an exemplary processing step in a camera automatic calibration method consistent with various embodiments of the present disclosure. Referring to FIG. 3, step S200 may include the S210-S220, which will be respectively described in detail in the following.

In step S210, an acquisition process may be performed to obtain the first projection point set of the plurality of test points in space, and also obtain the first collection point set of the plurality of test points collected by the camera to be re-calibrated.

In one embodiment, the process of obtaining the first projection point set of the plurality of test points in space may include, according to the images captured by cameras other than the camera to be re-calibrated, calculating the first spatial coordinates of each test point in the spatial coordinate system. The first spatial coordinates of the plurality of test points may be a set of three-dimensional coordinates. The process of obtaining the first projection point set of the plurality of test points in space may also include, according to the current calibration parameter of the camera to be re-calibrated, project the first spatial coordinates of each test point onto the camera to be re-calibrated to obtain the first projection point set of the plurality of test points in the camera coordinate system of the camera to be re-calibrated. It should be noted that, because the positions of the plurality of test points may change at different time, in one embodiment, the projection points corresponding to the first spatial coordinates captured by cameras other than the camera to be re-calibrated are defined as the first projection point set.

It should be noted that step S210 may be able to isolate the data of the camera to be re-calibrated, and thus the interference of the camera to be re-calibrated may be excluded and the first spatial coordinates of the plurality of test points in the spatial coordinate system may be obtained by other cameras.

It should be noted that, for the method of obtaining the first spatial coordinates, reference may be made to step S110, and the details will not be described here again. For the method of obtaining the first projection point set, reference may be made to step S120, and the details will not be described here again either. In addition, because the first spatial coordinates of each test point are projected onto the Xc-Yc plane of the camera coordinate system, each projection point in the formed first projection point set may be a data with two-dimensional coordinates.

It should be noted that, for the method of obtaining the first collection point set, reference may be made to step S130, and the details will not be described here again. In addition, because the test points are directly projected onto the Xc-Yc plane of the camera coordinate system, each collection point in the first collection point set that is formed by projection may be a data with two-dimensional coordinates.

In step S220, a matching step may be performed. For example, the Euclidean distance between each projection point in the first projection point set and each collection point in the first collection point set may be respectively calculated. According to a rule in which for each projection point, the collection point that has the smallest Euclidean distance from the projection point is determined as the matching point of the projection point, the point-to-point matching relationship between the plurality of projection points in the first projection point set and the plurality of collection points in the first collection point set may be determined.

In one embodiment, for each projection point in the first projection point set, the Euclidean distances between the projection point and each of the plurality of collection points in the first collection point set may be compared with each other to determine the matching relationship between the projection point and the collection point that corresponds to the smallest Euclidean distance. As such, a point-to-point matching relationship between the first projection point set and the first collection point set can be obtained.

For example, the first projection point set formed by projecting test point 1, . . . , test point n in a camera may be L1 $(x_{a1}, y_{a1})$, . . . , Ln $(x_{an}, y_{an})$, and the first collection point set formed through image processing of test point 1, . . . , test point n in the camera may be N1 $(x_{b1}, y_{b1})$, . . . , Nn$(x_{bn}, y_{bn})$. The Euclidean distances d1, d2, . . . , dn between L1 and N1 $(x_{b1}, y_{b1})$, Nn$(x_{bn}, y_{bn})$, respectively may then be calculated. When the value of d1 is the smallest among d1, d2, . . . , dn, d1 may then be considered as the minimum Euclidean distance, indicating that there is a matching relationship between L1 of the first projection point set and N1 of the first collection point set, that is, the two points both correspond to a same test point, e.g. test point 1.

It should be noted that for the description of establishing the point-to-point matching relationship, reference may also be made to step S140, which will not be described in detail here again.

In step S300, a calculation step may be performed to, according to the point-to-point matching relationship, calculate the distance difference between each projection point in the first projection point set and the matching collection point in the first collection point set, and then a new calibration parameter of the camera to be re-calibrated may be obtained based on the distance difference.

It should be noted that, the calibration parameter of a camera may include both internal and external parameters. The internal parameter may be unique, and may often be constructed by a parameter matrix ($f_x$, $f_y$, $c_x$, $c_y$) and a distortion coefficient (including three radial coefficients k1, k2, and k3, and two tangential coefficients p1 and p2). The external parameter, usually not unique, may be determined by the position relationship between the camera and the spatial coordinate system, and may be constructed by a rotation matrix (such as a rotation matrix R3×3) and a translation matrix (such as $T_x$, $T_y$, and $T_z$).

In one embodiment, the new calibration parameter may include rotation information and/or position information. The rotation information and the position information may be used to respectively calibrate the rotation status and the offset status of any camera with respect to the spatial coordinate system.

In one embodiment, step S300 may include the following steps.

First, the distance difference between each projection point of the first projection point set and the corresponding matching collection point may be calculated. As such, the distance difference between all projection points and the matching collection points may be obtained. The distance difference described above may be the Euclidean distance between the coordinate data.

Second, the rotation information R and the position information T may be obtained by performing reversed projection based on the distance differences. It should be noted that the reversed projection may implement the conversion process from two-dimensional coordinate data to three-dimensional coordinate data, and thus the rotation information R and the position information T may both be three-dimensional matrices.

Third, posture data (Re, Te) of the camera to be re-calibrated may be obtained based on the rotation information R and the position information T, and the posture data (Re, Te) may be determined as the new calibration parameter of the camera to be re-calibrated.

In step S400, an updating step may be performed to update the current calibration parameter of the camera to be re-calibrated with the new calibration parameter.

In another embodiment, referring to FIG. 1, in order to obtain a desired camera automatic calibration result, the camera automatic calibration method of the present disclosure may further include an iteration step S500 and an end step S600.

In step S500, i.e. in the iteration step, the steps from the processing step S200 to the updating step S400 may be repeated multiple times to perform an iterative process until the new calibration parameter calculated in the calculation step S300 is smaller than a preset first threshold Y2. As such, the current calibration parameter of the camera to be re-calibrated can be updated with the new calibration parameter obtained from the last iteration. That is, when the new calibration parameter is smaller than the first threshold Y2, the process may proceed to step S600; otherwise, the process may proceed to step S200.

It should be noted that the iterative process of step S500 is actually a process adopting a gradient descent method, where the gradient descent method is an optimization algorithm commonly used in machine learning and artificial intelligence to recursively approach the minimum deviation model and thus solve the minimum value along the direction of the gradient descent. Under normal circumstances, when the gradient vector is 0, it means that an extreme point is reached, and accordingly, the amplitude of the gradient is also 0. When the gradient descent algorithm is used to obtain optimal solution, the termination condition of the algorithm iteration may be the magnitude of the gradient vector approaching to 0. Therefore, a small constant threshold may be set to terminate the iteration. For example, in one embodiment, when the new calibration parameter is smaller than the first threshold Y2, the iterative process may be terminated.

In step S600, an ending process may be performed to finish the current camera automatic calibration process, that is, the current automatic calibration of the camera to be re-calibrated may be completed, such that the system may wait for performing the next automatic calibration.

Embodiment 2

Figure 6:
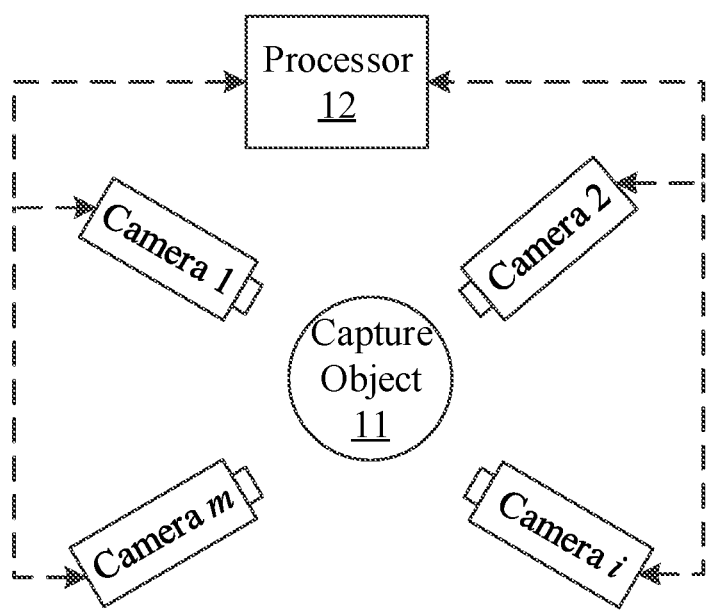
FIG. 6 illustrates a schematic structural view of an exemplary optical motion capture system consistent with various embodiments of the present disclosure.

The present disclosure also provides an optical motion capture system based on the camera automatic calibration method described above in the present disclosure. FIG. 6 illustrates a schematic structural view of an exemplary optical motion capture system consistent with various embodiments of the present disclosure. Referring to FIG. 6, the optical motion capture system may not only include a plurality of test points that need to be captured and a plurality of cameras for capturing the plurality of test points, but also include a processor 12.

In the optical motion system, as shown in FIG. 6, the plurality of test points may be disposed on one or more capture objects 11 (e.g., rigid bodies) in the motion space. The plurality of cameras (e.g., camera 1, camera 2, . . . , camera i, . . . , camera m, 1<i<m) may be distributed in the motion space, and may all be communicatively coupled to the processor 12 to capture the plurality of test points of the one or more capture objects.

It should be noted that in one embodiment, the plurality of test points may be reflective marking points or fluorescent marking points that are commonly used in optical motion capture system to configure rigid bodies.

The processor 12 may be configured to periodically calibrate each camera according to the camera automatic calibration method described in Embodiment 1. For example, the operating status of each camera may be periodically determined according to step S100. When camera 1 is determined as a camera to be recalibrated, according to steps S200-S500, the new calibration parameter of the camera 1 may be calculated and the current calibration parameter may be updated until the new calibration parameter obtained from the last iteration is smaller than the preset first threshold Y2, and then, step S600 may be performed to complete the current camera automatic calibration process.

Compared to existing camera automatic calibration methods and optical motion capture systems, the disclosed camera automatic calibration method and optical motion capture system may have the following exemplary advantages.

According to the disclosed camera automatic calibration method and optical motion capture system, the disclosed camera automatic calibration method includes a determining step, a processing step, a calculation step, an updating step, an iteration step, and an ending step. In a first aspect, the camera automatic calibration method is applicable to a computer vision system, and the calibration parameter of the camera can be continuously updated while the system collects the test points. The automatic calibration function may be realized through continuously optimizing the calibration state of the camera, which facilitates the system to be in an optimal calibration state at all times, thereby improving the accuracy and fluency of the system operation. In a second aspect, because the camera to be recalibrated is identified through the determining step, the camera to be recalibrated is in a shielded state. Therefore, not only the normal operation of the other cameras may not be affected, but also the normally-operating cameras can be used to support the camera automatic calibration for the camera to be recalibrated. In a third aspect, because a point-to-point matching relationship between the first projection point set and the first collection point set is realized during the processing step, calculating the distance difference corresponding to each test point becomes possible, which is conducive to improving the accuracy of the new calibration parameter of the camera. In a fourth aspect, during the iterative process, a gradient descent method may be adopted such that the new calibration parameter is able to reach a parameter-optimized state by repeatedly performing the iterative process, which may be conducive to reducing the errors of the camera automatic calibration and improving the accuracy of the camera automatic calibration result.

Those skilled in the art should understand that all or part of the functions of the various methods in the above embodiments may be implemented by hardware or by a computer program. When all or part of the functions in the above embodiments are implemented by a computer program, the program may be stored in a computer readable storage medium, and the storage medium may include: a read only memory, a random access memory, a magnetic disk, an optical disk, a hard disk, etc. The computer executes the program to implement the above functions. For example, the program is stored in the memory of the device, and when the program in the memory is executed by the processor, all or part of the above functions can be realized. In addition, when all or part of the functions in the above embodiment are implemented by a computer program, the program may also be stored in a storage medium such as a server, another computer, a magnetic disk, an optical disk, a flash disk or a mobile hard disk. The program may be saved to the memory of the local device through downloading or duplicating. Alternatively, the version of the system of the local device may be updated. When the program in the memory is executed by the processor, all or part of the functions described in the above embodiments may be implemented.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed is:

1. A camera automatic calibration method, used to calibrate a plurality of cameras and comprising:
   performing a determining step to determine a camera to be recalibrated from the plurality of cameras;
   performing a processing step to, according to a first projection point set of a plurality of test points in space and a first collection point set of the plurality of test points captured by the camera to be recalibrated, determine a point-to-point matching relationship between the first projection point set and the first collection point set, wherein the first projection point set is a set of two-dimensional points formed in a camera coordinate system when first spatial coordinates, formed by capturing the plurality of test points using cameras other than the camera to be recalibrated, are projected onto the camera to be recalibrated, and the first collection point set is a set of two-dimensional points formed by capturing the plurality of test points using the camera to be recalibrated;
   performing a calculation step to, according to the point-to-point matching relationship, calculate a distance difference between each projection point in the first projection point set and a matching collection point in the first collection point set, and obtain a new calibration parameter of the camera to be recalibrated based on the distance difference; and
   performing an updating step to update a current calibration parameter of the camera to be recalibrated with the new calibration parameter.

2. The method according to claim 1, wherein the determining step includes:
   calculating second spatial coordinates of each test point of the plurality of test points in a spatial coordinate system based on images captured by the plurality of cameras;
   projecting the second spatial coordinates to each camera according to a current calibration parameter of the camera to obtain a set of second projection points formed by the plurality of test points in the camera coordinate system of each camera;
   obtaining a second collection point set, wherein the second collection point set is a set of two-dimensional points formed by processing images of the plurality of test points captured by each camera of the plurality of cameras;
   for each camera of the plurality of cameras, respectively calculating a Euclidean distance between every two points that are respectively in the second projection point set and the second collection point set to determine the point-to-point matching relationship between the second projection point set and the second collection point set; and
   determining a camera as the camera to be recalibrated when, corresponding to the camera, a Euclidean distance between two points that are respectively in the second projection point set and the second collection point set and have a matching relationship exceeds a preset threshold range.

3. The method according to claim 2, after performing the updating step, further including an iteration step, including:
   repeating the processing step, the calculation step, and the updating step multiple times to perform an iterative process until the new calibration parameter calculated in the calculation step is smaller than a preset first threshold.

4. The method according to claim 1, wherein the processing step includes:
   obtaining the first projection point set of the plurality of test points in space, and obtaining the first collection point set of the plurality of test points collected by the camera to be recalibrated; and
   respectively calculating a Euclidean distance between every two points that are respectively in the first projection point set and the first collection point set; and determining a point-to-point matching relationship between the plurality of projection points in the first projection point set and the plurality of collection points in the first collection point set according to a rule in which for each projection point of the plurality of projection points, a collection point of the plurality of collection points that has a smallest Euclidean distance from the projection point is determined as a matching point of the projection point.

5. The method according to claim 4, wherein obtaining the first projection point set of the plurality of test points in space includes:
   according to images captured by cameras other than the camera to be recalibrated, calculating first spatial coordinates of each test point of the plurality of test points in a spatial coordinate system; and projecting the first spatial coordinates to the camera coordinate system of the camera to be recalibrated according to the current calibration parameter of the camera to obtain the first projection point set formed by the plurality of test points in the camera coordinate system of the camera to be recalibrated.

6. The method according to claim 5, after performing the updating step, further including an iteration step, including:
repeating the processing step, the calculation step, and the updating step multiple times to perform an iterative process until the new calibration parameter calculated in the calculation step is smaller than a preset first threshold.

7. The method according to claim 4, after performing the updating step, further including an iteration step, including:
repeating the processing step, the calculation step, and the updating step multiple times to perform an iterative process until the new calibration parameter calculated in the calculation step is smaller than a preset first threshold.

8. The method according to claim 1, after performing the updating step, further including an iteration step, including:
repeating the processing step, the calculation step, and the updating step multiple times to perform an iterative process until the new calibration parameter calculated in the calculation step is smaller than a preset first threshold.

9. The method according to claim 8, wherein:
the new calibration parameter includes rotation information and/or position information, wherein the rotation information and the position information are respectively used to calibrate a rotation status and an offset status of any camera with respect to a spatial coordinate system.

10. The method according to claim 9, wherein obtaining the new calibration parameter of the camera to be recalibrated based on the distance difference includes:
obtaining the rotation information and the position information by performing reversed projection based on the distance difference; and
obtaining posture data of the camera to be recalibrated based on the rotation information and the position information, and determining the posture data as the new calibration parameter of the camera to be recalibrated.

11. An optical motion capture system, comprising:
a plurality of cameras for capturing a plurality of test points, and
a processor, wherein:
the plurality of test points is disposed on one or more capture objects in a motion space;
the plurality of cameras is distributed in the motion space, and each camera of the plurality of cameras is communicatively coupled to the processor to capture the plurality of test points on the one or more capture objects; and
the processor is configured to periodically calibrate each camera of the plurality of cameras according to a camera automatic calibration method, including:
performing a determining step to determine a camera to be recalibrated from the plurality of cameras;
performing a processing step to, according to a first projection point set of a plurality of test points in space and a first collection point set of the plurality of test points captured by the camera to be recalibrated, determine a point-to-point matching relationship between the first projection point set and the first collection point set, wherein the first projection point set is a set of two-dimensional points formed in a camera coordinate system when first spatial coordinates, formed by capturing the plurality of test points using cameras other than the camera to be recalibrated, are projected onto the camera to be recalibrated, and the first collection point set is a set of two-dimensional points formed by capturing the plurality of test points using the camera to be recalibrated;
performing a calculation step to, according to the point-to-point matching relationship, calculate a distance difference between each projection point in the first projection point set and a matching collection point in the first collection point set, and obtain a new calibration parameter of the camera to be recalibrated based on the distance difference; and
performing an updating step to update a current calibration parameter of the camera to be recalibrated with the new calibration parameter.

12. The system according to claim 11, wherein the determining step of the camera automatic calibration method includes:
calculating second spatial coordinates of each test point of the plurality of test points in a spatial coordinate system based on images captured by the plurality of cameras;
projecting the second spatial coordinates to each camera according to a current calibration parameter of the camera to obtain a set of second projection points formed by the plurality of test points in the camera coordinate system of each camera;
obtaining a second collection point set, wherein the second collection point set is a set of two-dimensional points formed by processing images of the plurality of test points captured by each camera of the plurality of cameras;
for each camera of the plurality of cameras, respectively calculating a Euclidean distance between every two points that are respectively in the second projection point set and the second collection point set to determine the point-to-point matching relationship between the second projection point set and the second collection point set; and
determining a camera as the camera to be recalibrated when, corresponding to the camera, a Euclidean distance between two points that are respectively in the second projection point set and the second collection point set and have a matching relationship exceeds a preset threshold range.

13. The system according to claim 11, wherein the processing step of the camera automatic calibration method includes:
obtaining the first projection point set of the plurality of test points in space, and obtaining the first collection point set of the plurality of test points collected by the camera to be recalibrated; and
respectively calculating a Euclidean distance between every two points that are respectively in the first projection point set and the first collection point set; and determining a point-to-point matching relationship between the plurality of projection points in the first projection point set and the plurality of collection points in the first collection point set according to a rule in which for each projection point of the plurality of projection points, a collection point of the plurality of collection points that has a smallest Euclidean distance from the projection point is determined as a matching point of the projection point.

14. The system according to claim 13, wherein obtaining the first projection point set of the plurality of test points in space includes:
according to images captured by cameras other than the camera to be recalibrated, calculating first spatial coordinates of each test point of the plurality of test points in a spatial coordinate system; and
projecting the first spatial coordinates to the camera coordinate system of the camera to be recalibrated according to the current calibration parameter of the camera to obtain the first projection point set formed by the plurality of test points in the camera coordinate system of the camera to be recalibrated.

15. The system according to claim 11, wherein after performing the updating step, the camera automatic calibration method further includes an iteration step, including:
repeating the processing step, the calculation step, and the updating step multiple times to perform an iterative process until the new calibration parameter calculated in the calculation step is smaller than a preset first threshold.

16. The system according to claim 15, wherein:
the new calibration parameter includes rotation information and/or position information, wherein the rotation information and the position information are respectively used to calibrate a rotation status and an offset status of any camera with respect to a spatial coordinate system.

17. The system according to claim 16, wherein obtaining the new calibration parameter of the camera to be recalibrated based on the distance difference includes:
obtaining the rotation information and the position information by performing reversed projection based on the distance difference; and
obtaining posture data of the camera to be recalibrated based on the rotation information and the position information, and determining the posture data as the new calibration parameter of the camera to be recalibrated.

18. A non-transitory computer readable storage medium, comprising a program, wherein a processor executes the program to implement a camera automatic calibration method, the method including:
performing a determining step to determine a camera to be recalibrated from a plurality of cameras;
performing a processing step to, according to a first projection point set of a plurality of test points in space and a first collection point set of the plurality of test points captured by the camera to be recalibrated, determine a point-to-point matching relationship between the first projection point set and the first collection point set, wherein the first projection point set is a set of two-dimensional points formed in a camera coordinate system when first spatial coordinates, formed by capturing the plurality of test points using cameras other than the camera to be recalibrated, are projected onto the camera to be recalibrated, and the first collection point set is a set of two-dimensional points formed by capturing the plurality of test points using the camera to be recalibrated;
performing a calculation step to, according to the point-to-point matching relationship, calculate a distance difference between each projection point in the first projection point set and a matching collection point in the first collection point set, and obtain a new calibration parameter of the camera to be recalibrated based on the distance difference; and
performing an updating step to update a current calibration parameter of the camera to be recalibrated with the new calibration parameter.

19. The storage medium according to claim 18, wherein the determining step includes:
calculating second spatial coordinates of each test point of the plurality of test points in a spatial coordinate system based on images captured by the plurality of cameras;
projecting the second spatial coordinates to each camera according to a current calibration parameter of the camera to obtain a set of second projection points formed by the plurality of test points in the camera coordinate system of each camera;
obtaining a second collection point set, wherein the second collection point set is a set of two-dimensional points formed by processing images of the plurality of test points captured by each camera of the plurality of cameras;
for each camera of the plurality of cameras, respectively calculating a Euclidean distance between every two points that are respectively in the second projection point set and the second collection point set to determine the point-to-point matching relationship between the second projection point set and the second collection point set; and
determining a camera as the camera to be recalibrated when, corresponding to the camera, a Euclidean distance between two points that are respectively in the second projection point set and the second collection point set and have a matching relationship exceeds a preset threshold range.

* * * * *